United States Patent [19]

ViPond

[11] 4,083,105
[45] Apr. 11, 1978

[54] WIRE STRIPPERS

[75] Inventor: Clyde M. ViPond, Waterman, Ill.

[73] Assignee: Ideal Industries, Inc., Sycamore, Ill.

[21] Appl. No.: 610,536

[22] Filed: Sep. 5, 1975

[51] Int. Cl.² .......................... H02G 1/12; B21F 13/00
[52] U.S. Cl. ......................................... 30/90.4; 7/134;
7/107
[58] Field of Search .................... 30/90.6, 90.4, 90.8,
30/90.7, 91.1, 91.2; 7/5.4, 5.5, 5.6, 3 R, 4, 5;
81/9.5 R, 9.5 C

[56] References Cited

U.S. PATENT DOCUMENTS

| 1,065,679 | 6/1913 | Gregson et al. | 81/9.5 R |
| 1,113,986 | 10/1914 | Gregson et al. | 30/91.1 |
| 1,800,317 | 4/1931 | Ries et al. | 30/90.6 |
| 1,939,574 | 12/1933 | Saylor | 30/91.1 |
| 2,347,956 | 5/1944 | Lansing | 81/9.5 R |
| 3,871,078 | 3/1975 | Ogle | 30/90.1 |

Primary Examiner—James L. Jones
Assistant Examiner—Roscoe V. Parker
Attorney, Agent, or Firm—Kinzer, Plyer, Dorn & McEachran

[57] ABSTRACT

The non-metallic sheath of an electrical cable is stripped by a tool having a piercing barb positioned within a cable capturing recess, the barb being used to slit the sheath which is then peeled back and snipped off by a shear embodied in the tool.

1 Claim, 6 Drawing Figures

WIRE STRIPPERS

This invention relates to a tool for removing the outer sheath from an electrical cable of the kind in which the sheath is non-metallic.

In completing electrical cable connections it is customary to remove the outer sheath (an insulating elastomer) to expose the interior wires and then to strip the insulation from the interior wires to enable the electrical connections to be completed.

Stripping the insulation sheath from a single wire is customarily accomplished by a standard wire stripper having opposed semi-circular die edges which neatly encompass the sheath and produce a neat circular incision when the edges are closed, but stripping a sheath from a cable in this customary fashion cannot ordinarily be accomplished so easily. This is so for the reason the cable has considerable girth and is irregular in circumference because of the interior bundling. The electrician often has to test repeatedly for the diameter most susceptible to a complete one stroke girdling incision and even then it is difficult, because of the friction and irregularity to strip the separated end off the cable in the customary fashion.

These difficulties in separating a non-metallic sheath from a cable could be overcome by affording a tool in which the sheath is merely slit longitudinally, then peeled back and snipped off. The primary object of the present invention is to enable this operation to be accomplished by a tool having opposed blades operating on the principle of a pair of pliers. Another object of the invention is to devise such a tool in which the cable may be captured or immobilized between a pair of recessed blades and the sheath pierced as an incident to closing the blades, whereafter the piercing element is displaced to the end of the cable to complete a longitudinal slit in the sheath. The sheath may then be peeled back and snipped off. By so proceeding in accordance with the present invention the frictional resistance is reduced to the mere resistance offered to the piercing element as it makes the slit, compared to the friction encountered when trying to slip the severed portion of the sheath off the jacketed internal wires as in the instance where a circumferential cut of the customary kind is made.

Other objects of the invention are to configure one of the blades of the tool to constitute a guide, to locate the piercing element so that cables of different sizes may be handled and at the same time to equip the tool with a shear for separating the peeled back insulation.

Figure 1:
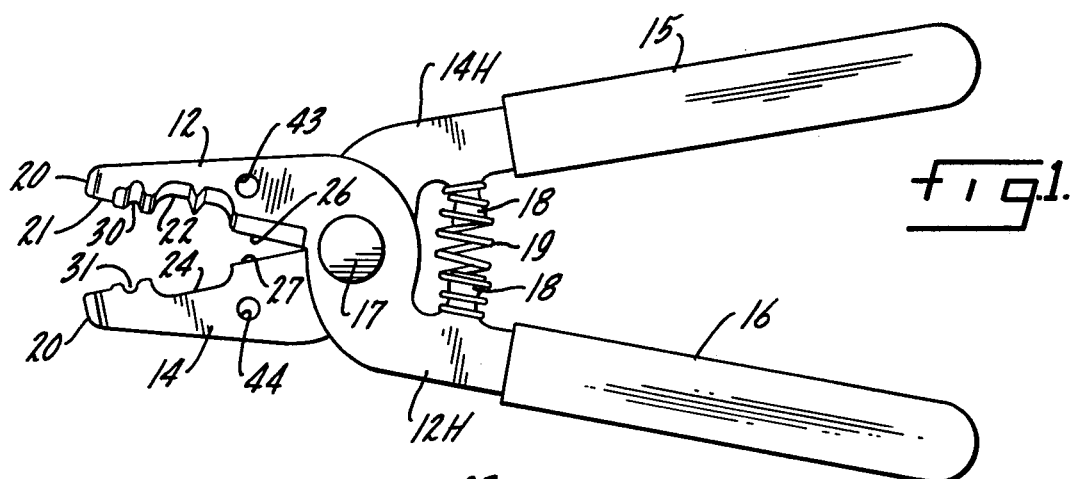
FIG. 1 is a view of the tool of the present invention in its assembled form.

The stripping tool of the present invention is identified by reference character 10 in FIG. 1 and comprises, in the position shown, an upper blade member 12 and an opposed lower blade member 14. Each blade member is of bell crank form with respective extensions 12H and 14H affording a pair of handles which may be equipped with elastomeric grips 15 and 16. The blade members are joined by a rivet 17, articulating the blades in plier fashion. The handle extensions are provided with mounting studs 18 for seating the ends of an extension spring 19 which normally biases the blade members to the open position shown. When the blades are to be closed, the handles are squeezed in opposition to the spring. The nose of each blade member terminates in an off-set 20 serving as opposed stops which limit the closed position of the blades.

The operating or inside edge 21 of the upper blade 12 is formed with a recess 22 and the inside edge of lower blade is formed with a complemental opposed recess 24 of like shape so that when the inside edges of the blades are closed on a cable positioned therebetween the recesses 22 and 24 encompass the sheath of the cable.

The operating edge of the upper blade is formed with a shear edge 26 opposed to a like shear edge 27 on the lower blade. Preferably these shear edges, as shown in the drawing, are located between the pivot 17 and the recesses which capture the cable. After the cable sheath is slit and peeled back in the manner hereafter described, the shearing tool may be used to snip the separated portion of the sheath.

Figure 2:
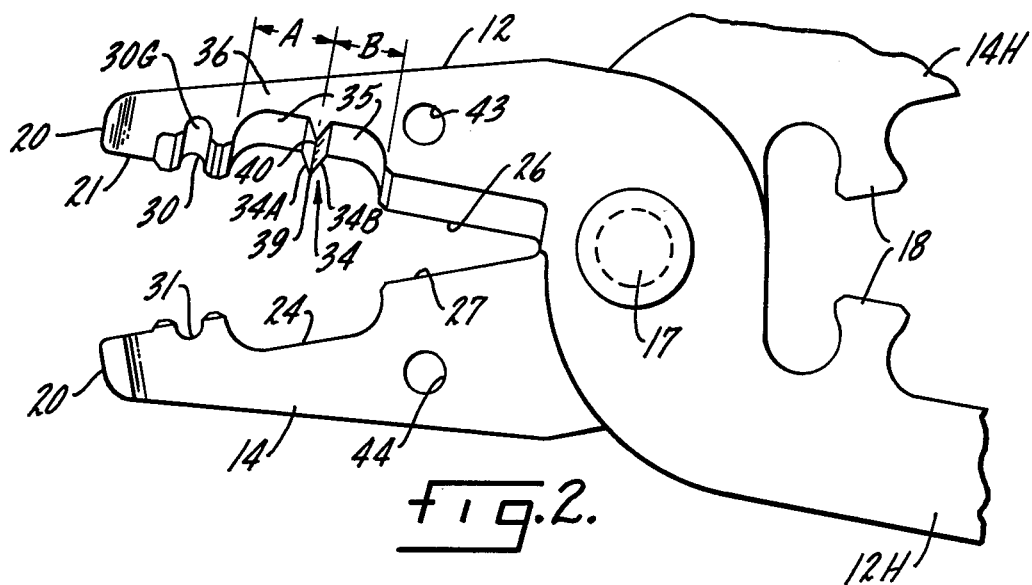
FIG. 2 is a fragmentary view similar to FIG. 1 on an enlarged scale showing the same side of the tool as shown in FIG. 1.
Figure 3:
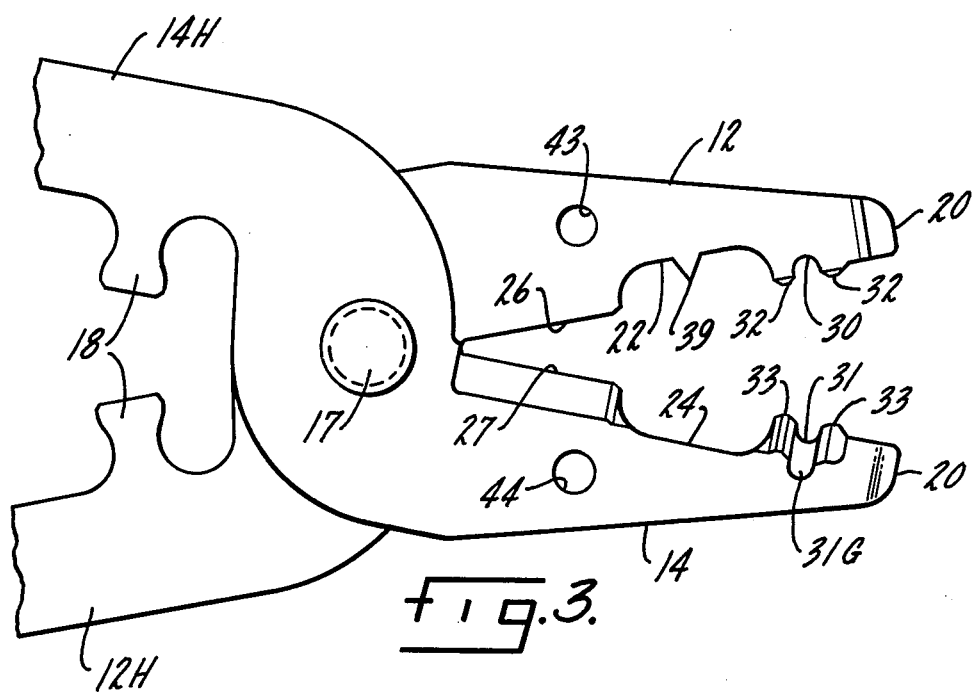
FIG. 3 is a fragmentary view, similar to FIG. 2, but showing the opposite side of the tool.

The inside edges of the blades are configured to present a wire stripper of the customary form represented by a die cutting edge 30 of semi-circular form on the upper blade and an opposed edge 31 of like kind on the lower blade. As shown in FIGS. 2 and 3 the die edges 30 and 31 are formed by machining opposed side faces of the blades at an angle resulting in grooves 30G and 31G which may be advantageously used as a guide when stripping the interior wires of the cable. Lands 32 and 33, respectively located on opposite sides of the stripper dies 30 and 31, slightly over-lap in the closed position of the blades, accurately limited when the off-set nose portions 20 engage on another.

As shown in FIGS. 2 and 3 the shearing blades 26 and 27 are also developed by sloping the corresponding faces of the blade members. The shear edges over-lap slightly in the closed position, also limited by engagement of the off-sets 20 in the closed position of the blade members.

One of the cable recesses is chambered, FIG. 2, to develop a piercing barb 34, affording at the same time a sloped guide surface 35 on opposite sides of the barb. The guide 35 slopes from the edge of the related recess 22 outwardly to the side face 36 of the related blade 12. The barb 34 includes both a piercing point 39 and a knife edge 40, developed by sloping the opposed sides 34A and 34B of the barb. By positioning the barb 34 slightly off center, between the ends of the cable recess 22, cables of different size may be handled, as will be described.

Figure 4:
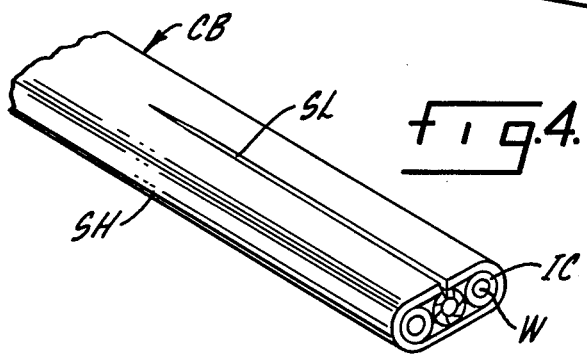
FIG. 4 is a fragmentary view of a cable, slitted in accordance with the present invention.

A fragment of non-metallic cable CB is shown in FIG. 4, typical of a three wire cable. The cable is known as non-metallic in the trade, characterizing an outer insulation sheath of flexible elastomer SH encompassing internal wires W which themselves are enclosed in insulating covers IC, although it will sometimes be the case that the ground wire will not be insulated.

Figure 5:
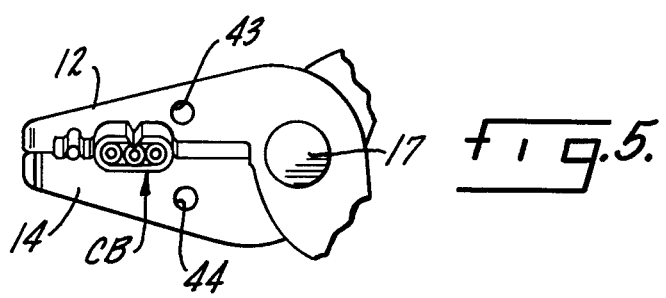
FIG. 5 is a fragmentary view on the scale of FIG. 1 showing the blade members in closed position, encompassing the cable.
Figure 6:
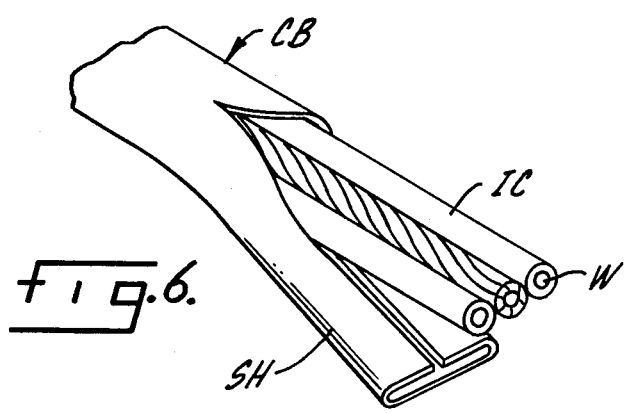
FIG. 6 is a view similar to FIG. 4 showing the cable sheath peeled back.

The cable is located between the cable recess 22 and 24 as shown in FIG. 5. Upon closure of the blade members the piercing barb penetrates the sheath as shown. The barb is so sized in its projecting length that only the cable sheath is pierced without penetrating to such an extent that one of the internal wires is nicked. The tool may then be tilted in the direction of the observer, FIG. 5, so that the knife edge 40 also penetrates the sheath, displacing the entire barb through the cable sheath, whereafter the tool is relatively displaced longitudinally along the sheath to form a slit SL to the end of the sheath as shown in FIG. 4. The guide surface 35 glides along the cable sheath. The sheath is then peeled back, FIG. 6. The peeled back portion is gathered and presented to the shear edges of the tool to be snipped off. The insulation IC on the internal wires may then be stripped by utilizing the die opening 30–31.

A pair of apertures 43 and 44 are drilled in the blade members. These may be used to twist the ends of the bare wire elements.

The cable recess 22–24 is of generous width, A & B, FIG. 2, the full complement of the three wire cable shown in FIG. 4. Cables of less width (two wires) may be slit by locating the cable against either side of the cable recess 22–24, next to the shear blades or next to the stripper die, whichever gives the better purchase for the piercing barb 34, accounting for the off-center location of the piercing barb compared to the lateral span of the recess 22.

I claim:

1. A tool for separating the outer non-metallic sheath from an electrical cable, to expose the interior core wires for stripping, and comprising:

a pair of opposed blade members articulated at a pivot for closing and opening movement relative to the cable located therebetween;

said blade members respectively presenting opposed recesses having spaced ends for encompassing the cable in the closed position of the blade members;

and a single piercing barb, presented by the tool and formed integrally thereon, said barb being located in one of the recesses only and projecting therefrom in the direction of the opposed recess, which pierces the cable sheath on closing the blades and then slits the cable sheath as an incident to subsequent longitudinal displacement between the tool and cable, said piercing barb being off-center compared to the lateral span of the recess and said recess ends being so spaced that cables of different width may be positioned in contact with one or the other of the recess ends, which ever gives the better purchase of the barb into the sheath, and to be guided thereby, said piercing barb being shaped to combine both a piercing point and a knife edge, said edge being sloped in the direction of one side face of the related blade member and only the recess in which the knife edge is located having a face sloped substantially parallel to the slope of the knife edge, such that on tilting the tool substantially the entire barb may penetrate the sheath and thereafter, during displacement between the tool and cable, the sloped face glides in a guiding-relation on the encompassed cable.

* * * * *